United States Patent [19]
Johnson et al.

[11] Patent Number: 6,000,228
[45] Date of Patent: Dec. 14, 1999

[54] CLEAR ICE AND WATER SAVER CYCLE FOR ICE MAKING MACHINES

[75] Inventors: D. Wayne Johnson, Selma; William F. Morris, Jr., Raleigh; Chris D. Wright, Rocky Mount, all of N.C.

[73] Assignee: Morris & Associates, Raleigh, N.C.

[21] Appl. No.: 08/996,999

[22] Filed: Dec. 23, 1997

[51] Int. Cl.⁶ ..................................................... F25C 1/12
[52] U.S. Cl. ................................... 62/73; 62/233; 62/348
[58] Field of Search .............................. 62/347, 348, 352, 62/73, 233

[56] References Cited

U.S. PATENT DOCUMENTS

| | | | |
|---|---|---|---|
| 3,026,686 | 3/1962 | Lowe | 62/149 |
| 3,034,310 | 5/1962 | Lowe | 62/197 |
| 3,254,501 | 6/1966 | Brysselbout | 62/347 |
| 3,280,585 | 10/1966 | Lowe | 62/347 |
| 3,964,270 | 6/1976 | Dwyer | 62/233 |
| 4,262,489 | 4/1981 | Sakamoto | 62/348 |
| 4,719,766 | 1/1988 | Morris, Jr. | 62/278 |
| 4,785,641 | 11/1988 | McDougal | 62/347 |
| 4,899,548 | 2/1990 | Dimijian | 62/347 |
| 4,966,015 | 10/1990 | Wessa | 62/352 |
| 4,982,574 | 1/1991 | Morris, Jr. | 62/155 |
| 5,167,130 | 12/1992 | Morris, Jr. | 62/196.1 |
| 5,237,837 | 8/1993 | Naruse et al. | 62/347 |
| 5,477,694 | 12/1995 | Black et al. | 62/348 |

*Primary Examiner*—William E. Tapolcai
*Attorney, Agent, or Firm*—Thelen Reid & Priest

[57] ABSTRACT

A reverse cycle defrost or water defrost type ice-maker refrigeration system includes a programmable controller which initiates a freezing cycle in which water is pumped for application to the chilled surface of an evaporator for freezing. All water that fails to be frozen absorbs minerals from the frozen water and is returned to the sump. The programmable controller terminates replenishment of water removed from the sump substantially prior to completion of the freezing cycle so that the sump level falls and the mineral content of water in the sump increases substantially. The ice is harvested at the end of the freezing cycle by hot refrigerant gas from the compressor directed to the evaporator or warm water while the sump is being drained and subsequently refilled prior to the initiation of a subsequent cycle of operation. The operation is energy efficient since water is saved and a reduced amount of water is used and a reduced amount of previously refrigerated water is disposed of by drainage of the sump.

19 Claims, 5 Drawing Sheets

CLEAR ICE AND WATER SAVER CYCLE FOR ICE MAKING MACHINES

BACKGROUND OF THE INVENTION

1. Field of the Invention

The present invention relates to a method and apparatus for making clear ice. More specifically, the invention relates to a method and apparatus for making clear ice using a minimum amount of water, particularly in connection with commercial and industrial ice making machines.

2. Related Art

One of the most desirable features of manufactured ice is that it be as clear as possible. Obtainment of highly clear ice is becoming increasingly more difficult to accomplish because of the deteriorating quality and the increasing hardness (as measured by mineral content) of the commercial water supply in all parts of the country.

The minerals and chemicals which are normally found in the commercial water supply will adversely affect its clarity, and will reduce the firmness of the ice. Water tends to freeze pure and clear and leave the minerals and chemicals concentrated behind in the remaining unfrozen water. Circulating or agitating the water on the ice-making surface serves to improve the efficiency of this separation process. In addition, it is necessary to bleed-off a certain portion of the surplus water containing the concentration of minerals and chemicals from the freezing process in order to maintain the hardness of the water at an acceptable level, so that the freezing of clear ice can continue.

Normally, the best procedure for achieving ice that is as clear as possible is to bleed-off a certain portion of the water being frozen, either on a continuous basis during the complete freezing cycle or all at once during the harvest cycle, in order to dispose of the minerals and chemicals. It has been the practice in the ice industry to supply water for freezing from a sump to the evaporators where the freezing is effected while concurrently adding water to the sump so that it remains full at all times. One of the major concerns arising from the aforementioned procedure is the fact that a large amount of water must be bled-off in order to get rid of the minerals and chemicals. Consequently, there must be substantial waste water expense and moreover, the energy employed in refrigerating the waste water prior to disposal is quite substantial since the bled-off water has been chilled to a temperature in the range of 32° F. to 35° F.

It is the solution to the foregoing and other problems to which the present invention is directed.

SUMMARY OF THE INVENTION

It is therefore a primary object of the present invention to make clearer ice at less cost than is possible through use of the prior known conventional methods of making ice.

It is another object of the invention to make clear ice while using less than half of the water and achieving a lower refrigeration cost than that required in the practice of the prior conventional methods.

These and other objects of the invention are achieved by concentrating all of the minerals and chemicals into less than half the normal amount of water in the sump before bleeding-off thereby requiring that only the remaining half of the sump water be bled-off because of the double concentration of minerals therein.

The present invention serves to make clearer ice than is possible with conventional ice-making apparatus using the prior known method of bleeding-off, and does so while resulting in less than half the conventional water and refrigeration costs by concentrating substantially all of the minerals and chemicals into less than half the conventional amount of water before bleeding-off. The present invention, in its preferred embodiment, achieves this function by the employment of a largely conventional reverse cycle defrost ice-maker mechanical refrigeration system including a plurality of evaporators having exterior surfaces on which ice is formed during a freezing cycle of the system. Preferably, these evaporators are of the tube type. A trough is positioned below the evaporator tubes for receiving excess water flow therefrom during the freezing cycle to be returned to the sump during the freezing cycle and for receiving ice discharged from the evaporators during the harvest cycle. A conveyor (preferably an auger) is located in the trough for conveying ice out of the trough after harvest.

In the refrigeration system for the reverse cycle ice maker a condenser/receiver is connected to a hot gas line from a compressor outlet. During the freezing cycle, the condenser/receiver receives and condenses the hot refrigerant gas to a liquid state by heat exchange with a cooling fluid or air; the resultant liquid refrigerant is then held in the condenser/receiver. A liquid refrigerant line is connected to the condenser/receiver for conducting the liquid refrigerant from the condensor/receiver under the control of a liquid-refrigerant solenoid valve in the liquid refrigerant line. Opening of the liquid refrigerant solenoid valve causes the liquid refrigerant to flow through an expansion valve into the liquid refrigerant line downstream of the solenoid liquid refrigerant valve. The liquid refrigerant downstream of the expansion valve then flows through the distributor into the interior refrigerant chambers of the evaporators in well known manner.

During harvest, the compressor also supplies a hot refrigerant gas to a hot gas line, which is in turn connected to a hot gas header. A hot gas valve and a hot gas bypass valve are provided in the hot gas line for controlling the flow of hot refrigerant gas from the compressor to the hot gas header, then to the evaporators to accomplish the defrost.

A suction accumulator tank is provided, with an inlet connected to the suction header and an outlet connected to the compressor suction lines. The suction header has inlets connected to the evaporator tubes for receiving gaseous refrigerant evaporated during the freezing cycle and its outlet is connected to the suction accumulator tank for conducting gaseous refrigerant back to the compressor suction.

A water supply header is positioned at the upper ends of the evaporators, for receiving water to be frozen from a sump and providing it to water discharge ports located in water supply rings or the like which spray water onto the exterior chilled surfaces of the evaporators. Most of the water sprayed onto the evaporator tubes is quickly frozen; however, the portion of the water that does not freeze drops into the trough in which it flows back to the sump and is recirculated again.

Water to be used during the freezing cycle is stored in the sump; a drain opening is in the bottom of the sump and a drain line is connected to the drain opening. A water inlet line supplies water to the sump from a water supply, with the flow of water from the water inlet line into the sump being controlled by a water inlet solenoid valve in the water inlet line, and the flow of water out of the sump through the drain line being controlled by the solenoid drain valve in the drain line. A water circulating pump pumps water from the sump into the water supply header, while a water supply pipe connects the pump to the water supply header.

The aforementioned equipment is connected to a programmable controller or timer which cycles the system between freezing and harvesting cycles in a new and novel manner by opening and closing the electrical circuits for the compressor, pumps, and refrigerant and water control valves to control the sequence and duration of operations for the freezing and harvest cycles. All of the valves are solenoid-controlled, and the controller or timer turns the solenoids and motors on and off in a manner to accomplish the desired operations and which provides substantial cost savings as compared to prior procedures.

One inventive method of operating the system in accordance with the present invention includes the sequential steps of starting the compressor and opening the liquid refrigerant valve and inlet water valve and turning on the pump at a time $T_0$, for closing the water inlet valve at a time $T_1$ following time $T_0$, for simultaneously turning off the pump and opening the sump solenoid drain valve at a time $T_2$ following time $T_1$, for closing liquid refrigerant solenoid valve and opening the hot gas bypass valve at a time $T_3$ following time $T_2$, for simultaneously opening the main hot gas valve and turning on the conveyor, at a time $T_4$ following time $T_3$, for simultaneously closing the sump drain valve and opening the water inlet valve at a time $T_5$ following time $T_4$, and for simultaneously closing the main hot gas valve and the hot gas bypass valve and turning off the conveyor at a time $T_6$ following time $T_5$, the time $T_1$ being during the freezing cycle. Preferably, but not essentially, $T_0$=0 seconds, $T_1 \approx 626$ seconds, $T_2 \approx 1021$ seconds, $T_3 \approx 1031$ seconds, $T_4 \approx 1051$ seconds, $T_5 \approx 1081$ seconds, and $T_6 \approx 1171$ seconds.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical and functional equivalents which operate in a similar manner to accomplish a similar purpose.

Figure 1:
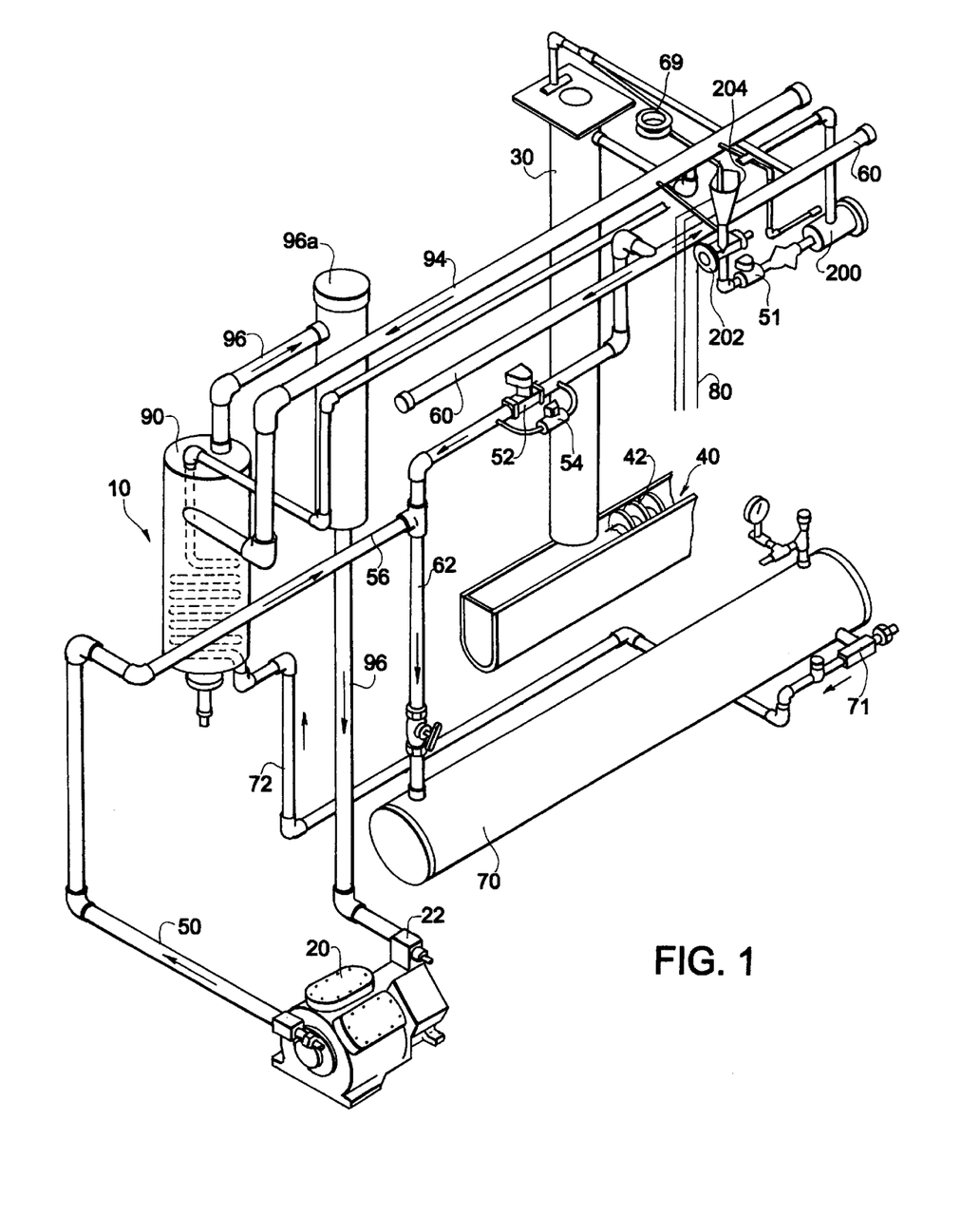
FIG. 1 is a diagrammatic view of the refrigeration circuitry components of the reverse cycle defrost ice-maker refrigeration system employed in the apparatus and method of the present invention.
Figure 2:
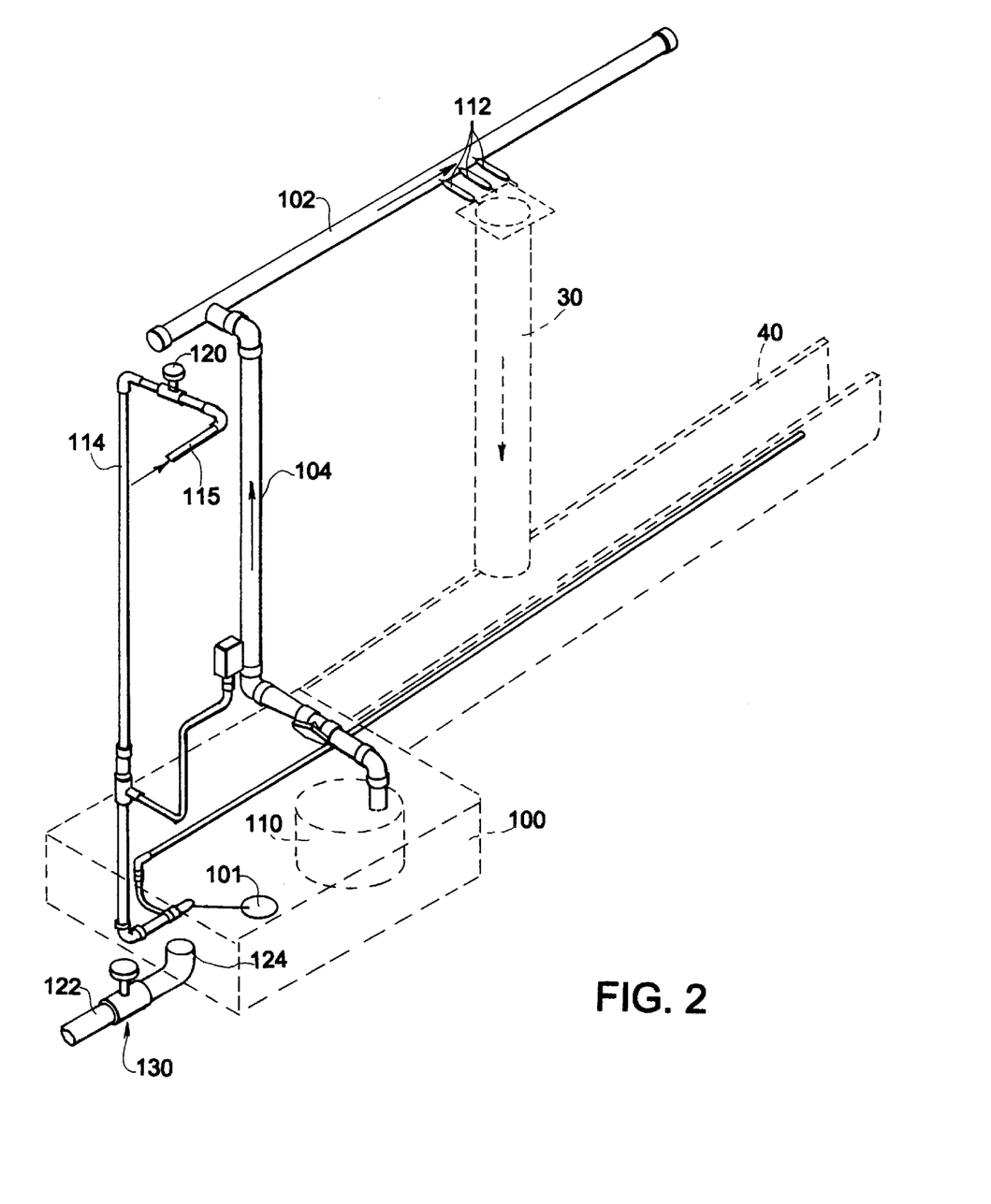
FIG. 2 is a perspective view of a portion of the reverse cycle defrost ice-maker refrigeration system of FIG. 1 illustrating the relationship of the sump to the other system components.
Figures 3, 3A:
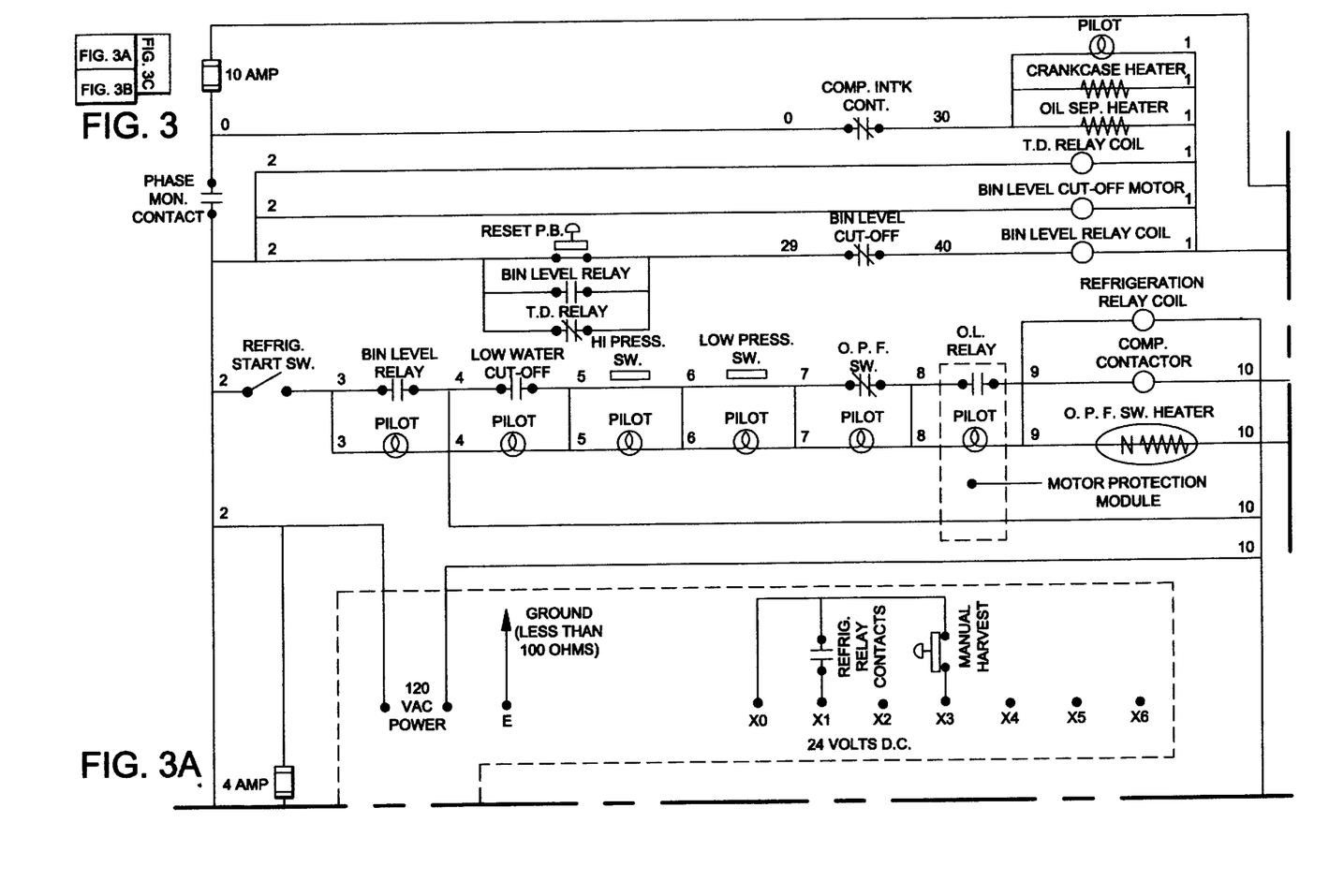
FIG. 3 is a circuit diagram of the electrical components employed in the reverse cycle defrost ice-maker refrigeration system of FIG. 1 in practice of the invention.
Figure 3B:
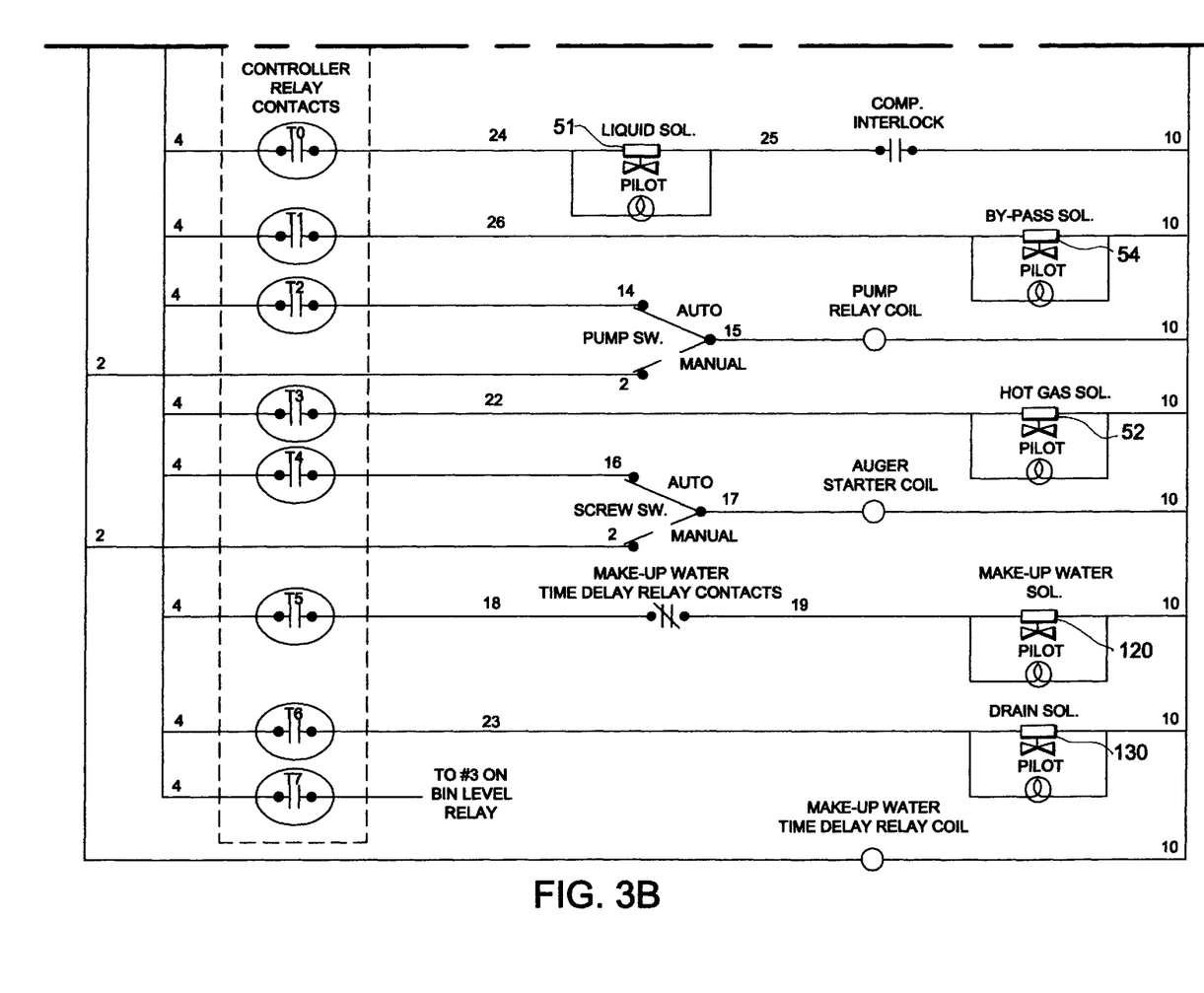
Figure 3C:
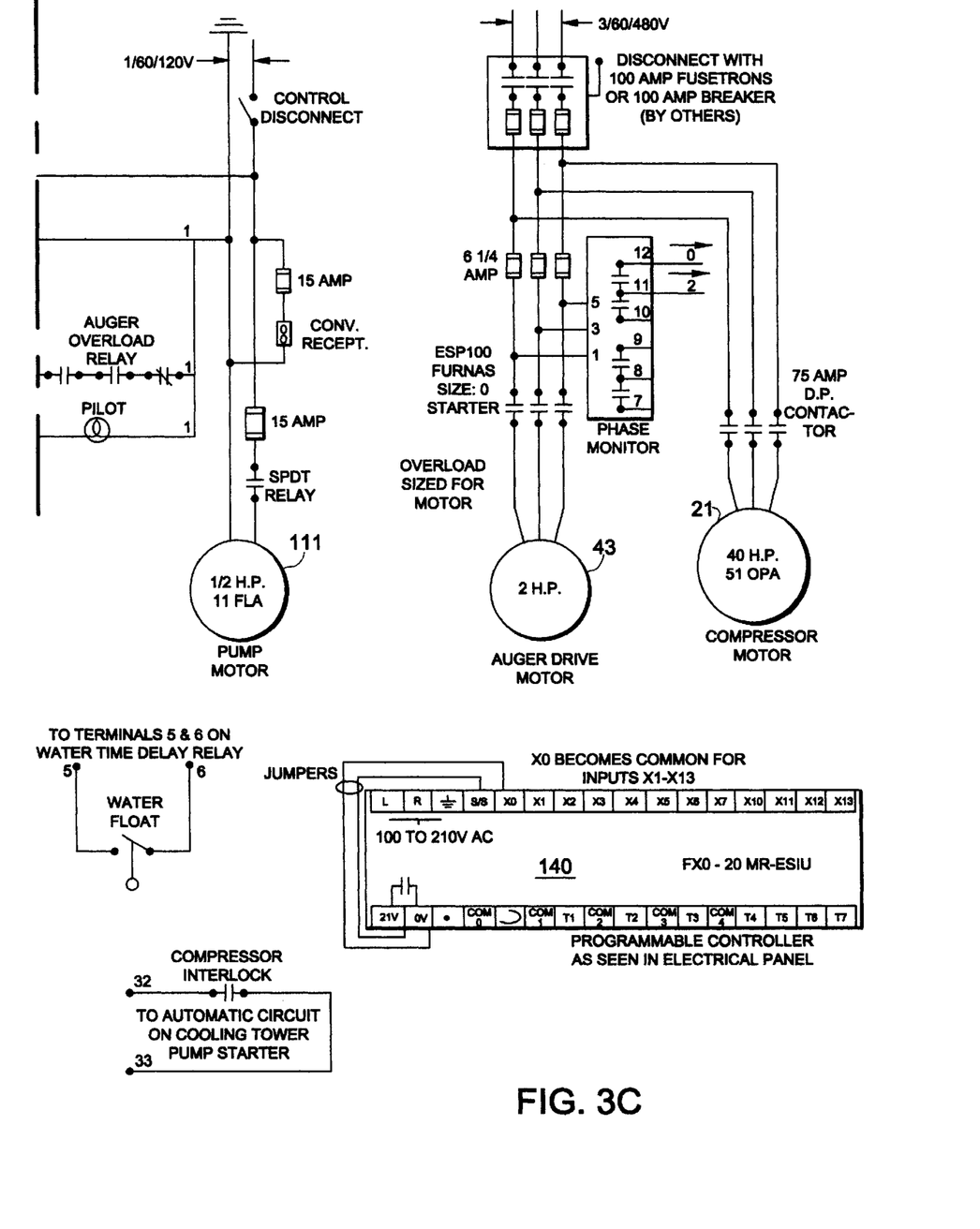

Referring now to FIGS. 1 through 3, there is shown a reverse cycle defrost ice-maker refrigeration system, generally designated 10, embodying the present invention. The refrigeration system 10 and its components, while not identical to U.S. Pat. No. 5,1167,130, operates on substantially the similar principles as those disclosed in U.S. Pat. No. 5,167,130 (which is incorporated herein in its entirety, and which is an improvement on the ice maker unit disclosed in U.S. Pat. No. 4,719,766 (which is also incorporated herein in its entirety).

The system 10 includes a generally rectangular housing (not shown) enclosing a compressor 20, an electrical and mechanical control circuitry shown in FIG. 3 and at least one, and preferably a plurality of ice maker evaporators, for example elongated evaporator tubes a single one of which 30 is illustrated in FIG. 1. The evaporator tubes 30 may be of the types disclosed in U.S. Pat. Nos. 5,167.130; 4,982,574; 3,280,585; 3,026,686, and 3,034,310 (which are incorporated herein in their entireties), which include interior refrigerant chambers (not shown), as discussed in greater detail below. The evaporator tubes 30 during the freezing cycle form ice on the exterior surfaces thereof, and during the harvest cycle, the evaporator tubes are warmed by hot gas to effect release of the ice which is gravitationally discharged into a trough 40 and moved by a conveyor, such as an auger 42 driven by auger drive motor 43, to a discharge or ice storage station (not shown).

Referring now to FIG. 1, the compressor 20 having a drive motor 21 supplies a hot refrigerant gas to a hot gas line 50. A main hot gas solenoid valve 52 and a hot gas bypass valve 54 are provided in the hot gas line 50 to connect the hot gas header 60 to the compressor 20. A hot gas discharge line 62 branching from the compressor hot gas line 50 is connected to a condenser/receiver 70 where the refrigerant is condensed to a liquid state by heat exchange with cooling air or water brought into heat exchange relationship with the hot gaseous refrigerant flowing into the condenser/receiver 70. The cooling of the gaseous refrigerant in the condenser/receiver 70 condenses the hot refrigerant gas provided by the compressor 20 to a liquid state.

From the condenser/receiver 70, the liquid refrigerant passes through a refrigerant liquid line 72 (which itself passes through suction accumulator tank 90) to a liquid refrigerant filter dryer 200, liquid solenoid valve 51 and then to thermal expansion valve 202, and then through a distributor 204 to the conventional interior refrigerant chambers (not shown) in the evaporator tubes 30.

A suction header 94 is connected to the upper portions of the evaporator tubes 30 to receive gaseous refrigerant which is evaporated during the freezing cycle and to conduct it back to suction accumulator tank 90. Gaseous refrigerant accumulated in the suction accumulator tank 90 from the suction header 94 is returned to the inlet 22 of compressor 20 from the suction accumulator tank 90 through a conduit 96 having a suction filter 98 therein.

Water to be frozen during the freezing cycle is stored in a sump 100 illustrated in FIG. 2. Sump 100 provides water to be frozen through a water supply pipe 104 to a water supply header 102 extending adjacent to the upper ends of evaporator tubes 30. A water circulating pump 110 which is driven by motor 11 pumps water from the sump 100 into the water supply pipe 104 for delivery to water discharge ports 112 or outlets located in water rings or an equivalent conventional assembly provided at the upper end of the evaporator tubes 30. Assembly 112 sprays or otherwise applies water onto the exterior of the chilled evaporator tube surfaces. The water for the most part is frozen by heat exchange relationship with the refrigerant in the evaporator tubes 30 in a conventional manner well known in the art. Any water that is not frozen drains into trough 40 and is consequently drained back into sump 100, for recirculation.

A water inlet line 114 supplies water to the water sump 100 from an inlet water supply line 115. A selectively actuable solenoid valve 120 in the water inlet line 114 controls the flow of replenishment water from the water inlet line 114 into sump 100. A float valve 101 precludes overfilling of sump 100.

Water can be drained from the sump 100 by a drain line 122 at a drain opening in the bottom of the sump 100. A selectively operable sump drain solenoid valve 130 in the drain line 122 when activated causes drainage of water out of the sump 100 through the drain line 122.

A programmable controller or timer 140 is provided for cycling the system 10 between freezing and harvesting cycles and is connected to the various controller relays for solenoid valves and the pump and auger drive motors and their power supply circuits by control signal conductors which are not illustrated for the sake of clarity. The programmable controller or timer is programmed to operate the relays, valves and motors in a unique manner so as to control the sequence of operations in a manner never previously done for the freezing and harvest cycles in a more cost efficient and functionally efficient manner than has heretofore been possible. It has been found that a Mitsubishi Model No. FXON-24MR-ES/UL programmable controller works well in providing the functions of controller 140; however, there are many other conventional programmable controllers that undoubtedly would provide equally satisfactory service.

More specifically, the normal ice making or freezing cycle begins with the sump 100 being full as a consequence of having been filled by previous opening of make-up water solenoid valve 120 to provide water through float valve 101, in a conventional manner, to fill the sump to a predetermined, normal level.

At a time $T_0$, drive motor 21 of compressor 20 is activated and the liquid-refrigerant solenoid valve 71 is turned ON to supply liquid refrigerant from the condenser/receiver 70 through the suction accumulator 90 to and through liquid refrigerant filter dryer 200, the liquid refrigerant solenoid valve 51, thermal expansion valve 202 to distributor 204 from which individual lines 206 respectively extend to the interior refrigerant chambers of each of the evaporator tubes 30. The drive motor 111 for water circulating pump 110 is turned ON to supply water to the exterior surfaces of the evaporator tubes 30 via the water supply pipe 104 and the water supply header 102.

At a time $T_1$, the evaporator tubes are chilled so that they freeze a substantial portion of the water distributed on and flowing down the exterior surfaces of the evaporator tubes and the inlet water solenoid valve 120 is turned OFF to stop the supply of water to the sump 100 for the remainder of the ice making cycle. However, circulating pump 110 continues to provide water from the sump to the exterior surface of evaporator tubes 30 so that the freezing cycle continues without the addition of any more water to the sump. The minerals and chemicals that are separated out during freezing are consequently concentrated in the remaining smaller amount of unfrozen water in the sump. At the end of the freezing cycle, the minimum amount of make-up water necessary to allow the pump 110 to function without cavitation remains in the sump 100 (that is, approximately one-quarter the maximum sump water level). As will be appreciated by those of skill in the art, the size of the sump 100 is critical to the efficiency of this process, and should be only large enough to prevent the pump 110 from cavitating upon start-up after defrost.

At a time $T_2$, the water circulating pump 110 is turned OFF to permit the ice to dry as the refrigeration continues.

The sump drain solenoid valve 130 is also opened at time $T_2$, to begin to drain the high mineral content water from sump 100. Since the water in sump 100 only amounts to approximately 25% of the sump's storage capacity at the time valve 130 is opened, less water is discharged than in the prior art procedures in which 35% to 50% of the sump capacity is drained from the sump. The sump 100 should continue to be drained as rapidly and completely as possible during the period when the ice is being harvested. Due to the higher concentration of minerals and chemicals in a correspondingly smaller volume of water, only a correspondingly smaller volume of water must be bled-off to achieve the discharge of ALL of the chemical and mineral impurities along with ALL of the water in the sump.

The freezing cycle ends and the harvesting cycle begins at a time $T_3$. At time $T_3$, the small hot gas bypass solenoid valve 54 is turned ON to clear any liquid refrigerant slugs from the hot gas header and the liquid refrigerant solenoid valve 71 is turned off At time $T_4$, the main hot gas solenoid valve 52 and the drive motor for auger 42 are turned ON, to bypass hot gaseous refrigerant directly from the compressor 20 to the hot gas header 60, which heats evaporator tubes 30 to free the ice formed on the exterior surfaces of the evaporator tubes 30 to be gravity discharged into the trough 40 where it is discharged from the trough 40 by the auger 42.

At a time $T_5$, the sump drain solenoid is closed and the inlet water solenoid is turned ON to fill the sump 100 for ice making.

At time $T_6$, the main hot gas solenoid, the hot gas bypass solenoid, and the auger 42 are turned OFF; and the liquid-refrigerant solenoid and water circulating pump 110 are turned ON for the next cycle of ice making.

The operations performed during each step of the cycle are summarized in the Table below:

| Cycle | $T_n$ Starting Time (in seconds) | Operation |
| --- | --- | --- |
| I | $T_0 = 0$ | Compressor, liquid-refrigerant solenoid valve 71, and Water circulating pump 110 and water inlet solenoid valve 120 are turned ON for ice making. |
|  | $T_1 = 626$ | Inlet water solenoid valve 120 is turned OFF to stop the supply of water to the sump for remainder of ice-making time. |
|  | $T_2 = 1021$ | Water circulating pump 110 is turned OFF. Sump drain solenoid valve 130 is turned ON to drain sump. |
|  | $T_3 = 1031$ | Liquid-refrigerant solenoid valve 71 is turned OFF Hot gas bypass solenoid valve 54 is turned ON. |
|  | $T_4 = 1051$ | Main hot gas solenoid valve 52 is turned ON to harvest ice. Ice maker auger drive motor 43 is turned ON to discharge ice from machine. |
|  | $T_5 = 1081$ | Sump drain solenoid valve 130 is turned OFF. Inlet water solenoid valve 120 is turned ON to fill sump for next ice making cycle. |
| II | $T_6 = 1171$ | Main hot gas solenoid valve 52, hot gas bypass solenoid valve 54, and auger motor are turned OFF. Liquid-refrigerant solenoid valve 71 and water circulating pump 110 are turned ON for ice making initiation. |

Thus, as can be seen from the table, in this example a single cycle in accordance with the present invention is completed in just under twenty minutes (i.e., in 1171 seconds). The present invention saves time in that the time for draining the sump is reduced and also saves water since less water is drained and at the end of the cycle and more importantly, a complete drainage of the separated minerals and deposits are achieved. Moreover, less power is consumed in refrigeration because less refrigerated water is discharged from the system.

Modifications and variations of the above-described embodiments of the present invention are possible, as appreciated by those skilled in the art in light of the above teachings. For example, the invention is not limited to use with the disclosed mechanical refrigeration system but could be used with practically any reverse cycle defrost type ice making apparatus employing a sump. For example, the invention could be used in conventional systems employing warm water defrost for harvesting of ice frozen on one side of a plate. In such an operation, the programmable controller would activate a solenoid valve for supplying the warm water rather than hot gas.

It is therefore to be understood that, within the scope of the appended claims and their equivalents, the invention may be practiced otherwise than as specifically described.

What is claimed is:

1. A method of making ice comprising the steps of:
   a. providing make-up feed water to a sump and providing liquid refrigerant to an evaporator to chill an ice making surface of the evaporator while applying water from the sump to the ice making surface to effect freezing of a portion of the water on the ice making surface and returning the unfrozen portion of the water to the sump;
   b. terminating the application of water to the sump part way through the freezing cycle while continuing to provide water from the sump to the ice-making surface of the evaporator, so that the amount of water in the sump is decreased by not totally depleted while the mineral content of the remaining water is increased in the sump during the latter part of the freezing cycle;
   c. initiating drainage of the remaining sump water with the increased mineral content; and
   d. initiating harvesting the ice from the ice making surface of the evaporator.

2. The method of claim 1, wherein the sump is substantially full of water when the application of water to the ice making surface of the evaporator is initiated.

3. The method of claim 1, wherein the provision of liquid refrigerant to the ice making surface of the evaporator is terminated prior to initiation of the harvesting of the ice.

4. The method of claim 1, wherein steps c and d are initiated substantially simultaneously.

5. The method of claim 1, wherein the provision of liquid refrigerant to the ice making surface of the evaporator is terminated subsequent to steps b and c.

6. The method of claim 2, wherein the provision of liquid refrigerant to the evaporator is terminated prior to initiation of the harvesting of the ice.

7. The method of claim 6, wherein steps c and d are initiated substantially simultaneously.

8. The method of claim 1, including the step of substantially refilling the sump with the water subsequent to completion of drainage of the sump initiated in step c.

9. The method of claim 7, wherein the provision of liquid refrigerant to the evaporator is terminated prior to initiation of the harvesting of the ice.

10. The method of claim 4, wherein steps c and d are initiated substantially simultaneously.

11. The method of claim 9, wherein the provision of liquid refrigerant to the ice making surface of the evaporator is terminated subsequent to steps b and c.

12. The method of claim 7, wherein the sump is substantially full of water when the application of water to the ice making surface of the evaporator is initiated.

13. The method of claim 11, wherein the provision of liquid refrigerant to the ice making surface of the evaporator is terminated prior to initiation of the harvesting of the ice.

14. The method of claim 12, wherein the provision of liquid refrigerant to the ice making surface of the evaporator is terminated subsequent to steps b and c.

15. A method of making ice using a reverse cycle defrost ice-maker refrigeration system including at least one evaporator having a surface on which ice is formed during a freezing cycle of the system, a trough positioned below the evaporator for receiving ice discharged therefrom, a conveyor located in the trough for conveying ice out of the trough, a hot gas line, a compressor for supplying a hot refrigerant gas to the hot gas line, a hot gas header connected to the compressor through the hot gas line, a hot gas valve and a hot gas bypass valve provided in the hot gas line for controlling the flow of hot refrigerant to the hot gas header, a condenser/receiver connected to the hot gas line for condensing the hot refrigerant gas to a liquid state by heat exchange with a cooling fluid, a refrigerant liquid line connecting the condenser/receiver to an expansion valve in communication with the evaporator, a water supply header positioned at the upper end of the evaporator, means for discharging water from the water supply header onto the exterior surface of the evaporator, a sump for storing water to be used during the freezing cycle, the sump having a drain opening in the bottom thereof and a drain line at the drain opening for draining water out of the sump, a water inlet line for supplying water to the sump from a water supply, a water supply pipe connecting the sump to the water supply headers, a water circulating pump for pumping water from the sump into the water supply pipe, a water inlet valve in the water inlet line for controlling the flow of water from the water inlet line into the sump, a sump drain valve in the drain line for controlling the flow of water out of the sump through the drain line, and control means for cycling the system between the freezing and harvesting cycles by opening and closing the valves to control the sequence of operations for the freezing and harvest cycles, said method comprising the steps of:
   a. at a time $T_0$, turning on the compressor, opening the liquid-refrigerant valve and the water inlet supply valve, and turning on the water circulating pump for ice making;
   b. at a time $T_1$ following said step a, closing the water inlet valve to stop the supply of water to the sump for the remainder of the ice-making time;
   c. at a time $T_2$ following said step b, simultaneously turning off the water circulating pump and opening the sump drain valve to drain the sump;
   d. at a time $T_3$ following said step c, simultaneously closing the liquid-refrigerant valve and opening the hot gas bypass valve;
   e. at a time $T_4$ following said step d, simultaneously opening the main hot gas valve to harvest the ice and turning on the conveyor to break-up and discharge ice from the ice making unit;
   f. at a time $T_5$ following said step e, simultaneously closing the sump drain valve, and opening the water inlet valve to fill the sump for ice making; and
   g. at a time $T_6$ following said step f, simultaneously closing the main hot gas valve and the hot gas valve, and turning off the conveyor.

16. The method of claim 15, comprising repeating said steps a–g to effect a subsequent cycle of operation.

17. The method of claim 15, wherein $T_0 = 0$ seconds, $T_1 \approx 626$ seconds, $T_2 26\ 1021$ seconds, $T_3 \approx 1031$ seconds, $T_4 \approx 1051$ seconds, $T_5 \approx 1081$ seconds, and $T_6 \approx 1171$ seconds.

18. A reverse cycle defrost ice-maker refrigeration system comprising:
- at least one evaporator having a surface on which ice is formed during a freezing cycle of said system;
- a trough positioned below said evaporator for receiving ice discharged from said evaporator;
- a conveyor located in the trough for conveying ice out of the trough;
- a hot gas line;
- a compressor for supplying a hot refrigerant gas to said hot gas line, said compressor having an inlet and an outlet;
- a hot gas header connected to said outlet of said compressor;
- a hot gas valve in said hot gas line for controlling the flow of hot refrigerant gas from said compressor to said hot gas header;
- a condenser connected to said hot gas line for condensing the hot refrigerant gas to a liquid state by heat exchange with a cooling media;
- a receiver for the liquid refrigerant from said condenser;
- a liquid-refrigerant line connecting said receiver to said condenser;
- a water supply header positioned at the upper end of said evaporator;
- means for discharging water from said water supply header onto said exterior surface of said evaporator;
- a sump for storing water to be used during the freezing cycle, said sump having a drain opening in the bottom thereof and a drain line at said drain opening for draining water out of said sump, and said sump being connected to said water supply header for supplying water to said water supply header;
- a water inlet line for supplying water to said sump from a water supply;
- a water circulating pump for pumping water from said sump into said water supply pipe;
- a water inlet valve for controlling the flow of water from said water inlet line into said sump;
- a sump drain valve for controlling the flow of water out of said sump through said drain line; and
- control means for cycling said system between the freezing and harvesting cycles by opening and closing said valves to control the sequence of operations for the freezing and harvest cycles, said control means including means for closing said water inlet valve in said water inlet line during the freezing cycle prior to termination of the freezing cycle, wherein said control means includes means for closing said liquid-refrigerant valve and turning off said pump at a time $T_0$, for closing said water inlet valve at a time $T_1$ following time $T_0$, for simultaneously turning off said pump and opening said sump drain valve at a time $T_2$ following time $T_1$, for opening said hot gas bypass valves at a time $T_3$ following time $T_2$, for simultaneously opening said main hot gas vales, turning on said conveyer, and closing said liquid-refrigerant valve at a time $T_4$ following time $T_3$, for simultaneously closing said sump drain valve and opening said water inlet valve at a time $T_5$ following time $T_4$.

19. The system of claim 18, wherein $T_0 = 0$ seconds, $T_1 \approx 626$ seconds, $T_2 \approx 1021$ seconds, $T_3 \approx 1031$ seconds, $T_4 \approx 1051$ seconds, $T_5 \approx 1081$ seconds, and $T_6 \approx 1171$ seconds.

* * * * *